United States Patent
Grommes et al.

(10) Patent No.: US 6,994,036 B2
(45) Date of Patent: Feb. 7, 2006

(54) COAL-FIRED POWER STATION

(75) Inventors: Klaus Grommes, Voerde (DE);
Wolfgang Schulthoff, Oberhausen (DE)

(73) Assignee: Steag Encotec GmbH, (DE)

( * ) Notice: Subject to any disclaimer, the term of this patent is extended or adjusted under 35 U.S.C. 154(b) by 6 days.

(21) Appl. No.: 10/500,513

(22) PCT Filed: Dec. 20, 2002

(86) PCT No.: PCT/EP02/14633

§ 371 (c)(1),
(2), (4) Date: Jun. 28, 2004

(87) PCT Pub. No.: WO04/001290

PCT Pub. Date: Dec. 31, 2003

(65) Prior Publication Data

US 2005/0061261 A1    Mar. 24, 2005

(30) Foreign Application Priority Data

Jun. 20, 2002 (DE) ................ 102 27 639

(51) Int. Cl.
*F23J 3/00* (2006.01)
(52) U.S. Cl. ............ 110/165 A; 110/165 R; 110/216; 110/217; 110/234
(58) Field of Classification Search ......... 110/165 R, 110/165 A, 169, 170, 173 R, 179, 175 R, 110/344, 345, 347, 217, 216, 233, 234
See application file for complete search history.

(56) References Cited

U.S. PATENT DOCUMENTS 5,687,656 A * 11/1997 Kaneko et al. ............ 110/216
5,785,936 A *  7/1998 Levendis .................... 423/210

FOREIGN PATENT DOCUMENTS

| CA | 929 036  | 6/1973  |
| DE | 838 676  | 5/1952  |
| DE | 1 985 666 | 5/1968  |
| DE | 44 36 207 | 7/1995  |
| EP | 0 600 440 | 6/1994  |
| EP | 0 764 455 | 3/1997  |
| FR | 1387107  | 12/1964 |

* cited by examiner

*Primary Examiner*—Kenneth Rinehart
(74) *Attorney, Agent, or Firm*—Robert W Becker & Associates; Robert W Becker

(57) ABSTRACT

A coal-fired power station is provided and has a boiler that is heatable by dry firing, a catalytic converter for reducing an $NO_x$ level, a flue gas channel that adjoins the boiler and leads to the catalytic converter, and a coarse ash separator disposed upstream of the catalytic converter in a section of the flue gas channel, which includes a sieve that extends essentially over an entire cross-sectional area thereof. The sieve is adapted to be deflected out of a position of rest by a flue gas stream and against the effect of a restoring force, and/or the sieve forms folds that are directed in an upstream direction relative to a flue gas stream and extend essentially parallel to one another.

10 Claims, 2 Drawing Sheets

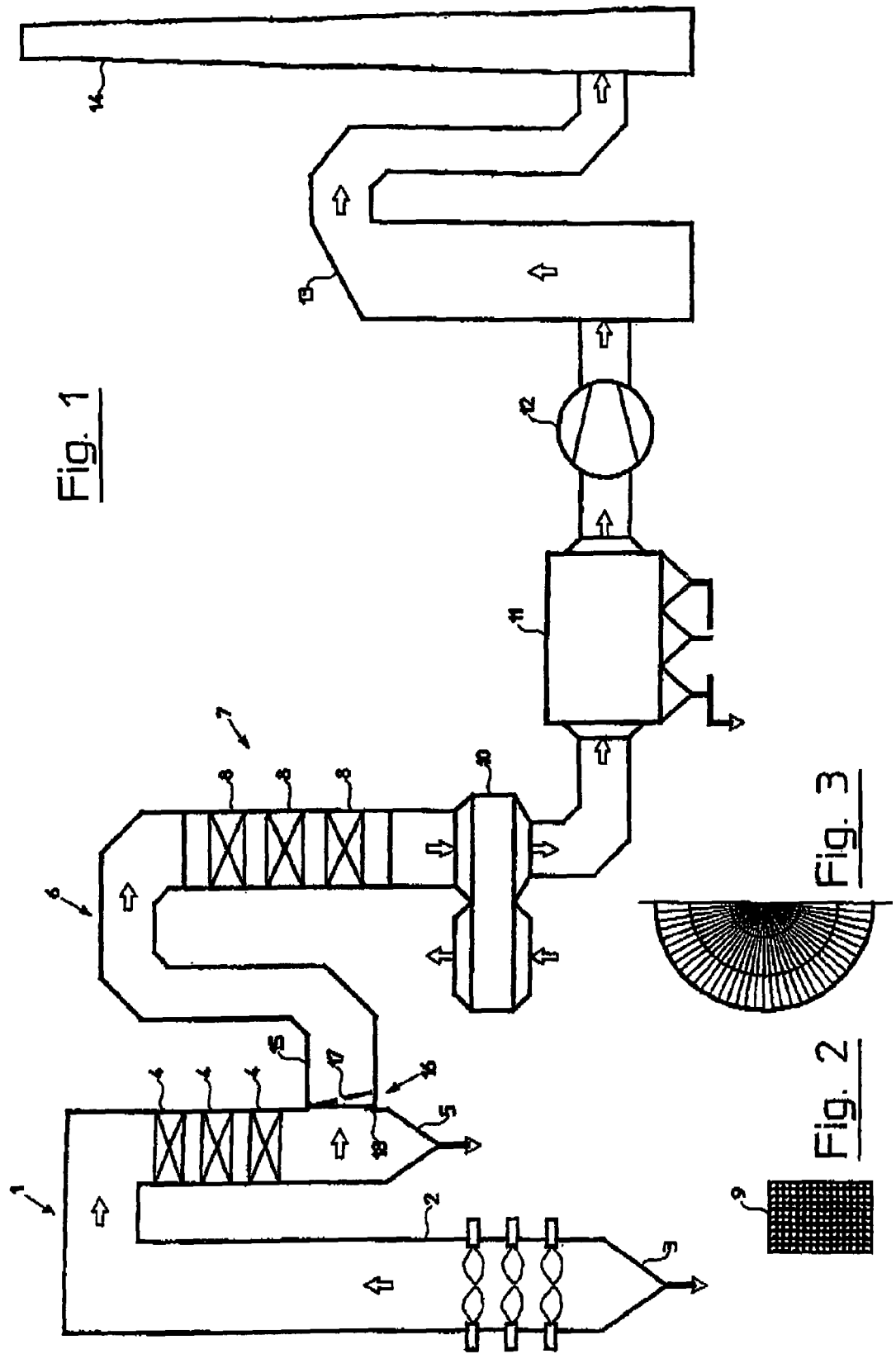

Detail "A"

COAL-FIRED POWER STATION

The specification incorporates by reference the disclosure of German priority document 102 27 639.0 filed Jun. 20, 2002 and PCT/EP2002/014633 filed Dec. 20, 2002.

The present invention is, of course, in no way restricted to the specific disclosure of the specification and drawings, but also encompasses any modifications within the scope of the appended claims.

BACKGROUND OF THE INVENTION

The invention relates to a coal-fired power plant or station having a boiler that can be heated by a dry firing, and with a flue gas channel that adjoins the boiler and that leads to a catalytic converter for reducing the $NO_x$ level.

During dry firings, the ash is produced as dry dust that is partially withdrawn at the bottom out of the combustion chamber, but also is partially carried along by the flue gas stream. The catalytic converter for reducing the $NO_x$ level comprises packings of narrow channels, and the carried-along dust has the tendency to accumulate on the catalyzer surfaces. This leads to the channel walls increasingly losing their catalytic effect. One is therefore forced to clean off the catalytic converters frequently with the use of soot blowers or also by the use of ultrasound. However, it was found that nevertheless the tendency existed for the catalyzer channels to become obstructed or clogged, and in particular in such a way that the obstructions could no longer be eliminated with conventional means.

In addition to a reduction of the catalytic effect, the pressure loss was increased due to the reduction of the flow cross-section. Similar obstruction effects were observed on the downstream air preheater, which operates in a regenerative manner. The pressure loss can become so great that the electrostatic filter, which is disposed downstream of the air pre-heater, reaches its limit of stability or resistance due to the induced-draft blower that follows. This can cause the load of the power station to be reduced, a measure that is a disadvantage and in addition, of course, does not represent a permanent solution. Rather, sooner or later the power station must be shut down in order to replace the clogged catalytic converters. However, even in the disassembled state elimination of the obstructions is not very practicable.

It is therefore an object of the invention to be able to protect the catalytic converter for reducing the $NO_x$ level against such obstructions in a simple and effective manner where such obstructions can no longer be eliminated with conventional means.

SUMMARY OF THE INVENTION

To realize this object, the inventive coal-fired power station is characterized by providing a coarse ash separator disposed upstream of the catalytic converter in a section of the flue gas channel, wherein the flue gas channel includes a sieve that extends essentially over an entire cross-sectional area of atheflue gas channel, and wherein the sieve is adapted to be deflected out of the position of rest by a flue gas stream and against the effect of a restoring force.

The invention is based upon the recognition that as a function of the type of coal and of the temperature distribution within the combustion chamber, localized exceeding of the softening or sintering point can occur. This leads to the originally dry, pulverous ash particles sticking together or even sintering together. Coarse ash particles result that although they enter the catalyzer channels, they can become caught there and together build up to form obstructions. The adhesion within the catalyzer channels is sufficient to preclude a cleaning with normal means. Theoretically, one could push through the individual channels, though not from a practical standpoint if one considers that the catalyzer channels each have a cross-section of an order of magnitude of 50 $mm^2$, while the cross-section of the exhaust or flue gas channel is of an order of magnitude of 45 $m^2$. The channels are approximately 1 m long, and the flue gas channel contains 3 to 4 of such catalytic converter planes.

The renewal of the catalytic converters is extremely expensive, and in particular on the one hand due to the unavoidable shutdown of the power station, and on the other hand due to the procurement and assembly costs of the catalytic converters. The inventive coarse ash separator prevents ash particles of such a size that they can cause a clogging of the catalytic converters. The sieve has an appropriate mesh width. Furthermore, the sieve extends essentially over the entire cross-sectional area of the flue gas channel.

Of great significance is that the sieve is kept in motion by the flue gas stream. The flue gas stream is subjected to constant, slight pulsations that suffice to cause the desired movements or vibrations of the sieve. Added to this are strong changes of the flue gas stream, if, for example, the load of the power station is managed.

The movements of the sieve lead to a shaking-off of the coarse ash particles that have adhered to the sieve surface. In this connection, it is particularly advantageous to define the rest position of the sieve by a stop that from time to time abruptly stops the restoring movement of the sieve. The thereby produced impact also allows those particles to disengage that have become relatively fixedly caught in the sieve.

The sieve can be disposed perpendicular to the direction of flow of the exhaust or flue gas stream or can also be disposed at an angle thereto. The force of a spring can be utilized as the restoring force. Generally, it would be more advantageous to use the force of gravity as the restoring force. The sieve can also be elastically anchored in the flue gas channel, whereby the restoring force is produced by the hinged mounting of the sieve. The sieve can be hinged or otherwise connected in the interior of the flue gas channel at the bottom, at the side, or also at the top.

In the last-mentioned case, it is particularly advantageous when the section of the flue gas channel in which the coarse ash separator is disposed extends essentially horizontally, and if the sieve of the coarse ash separator is hingedly suspended. This represents a very simple and effective construction, whereby the force of gravity provides the restoring force.

In this connection, the stop that defines the rest position of the sieve can be offset downstream relative to the hinged suspension of the sieve. This means that in its rest position the sieve assumes a certain inclined position, and that during the return oscillation or pivoting, the sieve already strikes the stop before it reaches a vertical position. The cleaning effect due to the de-scaling or beating of the sieve is thus particularly intensive.

The features wherein the sieve forms folds that are directed in an upstream direction relative to a flue gas stream and extend essentially parallel to one another characterize an approach of the stated object that can be utilized independently of the previously discussed approach, preferably, however, together with the previously discussed approach. The folds of the sieve, which extend essentially parallel to one another, effect a drastic enlargement of the sieve surface and thus offer the possibility of being able to make the sieve openings relatively small. It was found that the critical size of the coarse ash particles begin at about 5 mm. Thus, the size of the sieve openings is preferably selected to be about 5 mm×5 mm. In addition to this purely sieve effect the formation of folds additionally effects an increased self-cleaning of the sieve. The particles strike the sieve surface at an angle, so that their movement has a component that is parallel to the sieve surface. This counteracts the tendency of the particles to become caught in the sieve openings. Added to this is the fact that also the exhaust gas stream experiences a certain deflection and turbulence, which also enhances the self cleaning effect.

The important thing is that the folds of the sieve be directed upstream, and that the sieve itself have an orientation that allows the particles to fall out of the sieve folds. Whether flow to the sieve is at right angles or at an angle, and whether the sieve is disposed in a horizontal, a vertical or an inclined flue gas channel, play no role in this regard.

The folds of the sieve can be bulged. However, it is more advantageous for the folds of the sieve to be formed by planar surface sections that are disposed at an angle relative to one another. This precludes the particles from striking certain sieve surface regions essentially at right angles.

It is proposed pursuant to a further development of the invention that the surface sections of the sieve rest against support networks or meshes that are disposed downstream. This prevents the sieve from buckling. As mentioned, the dimensions of the sieve openings are 5 mm×5 mm, whereby the wire of the sieve has a diameter of 1 mm. The support mesh, on the other hand, preferably has a mesh size of 33 mm×33 mm and in particular at a wire thickness of about 3 mm. It was found that at these dimensions an increase of the pressure loss due to the support mesh is minimal, and that on the other hand the sieve is held very reliably.

A particularly straightforward construction results when the surface sections of the sieve, and the pertaining support mesh, are drawn onto frames that are secured to a support structure. If wear or other damage occurs, the frames can be individually replaced or exchanged.

Pursuant to an important further development of the invention it is proposed that the section of the flue gas channel that contains the coarse ash separator follow an ash funnel, and that the coarse ash separator be disposed at the transition from the ash funnel to the section of the flue gas channel. As a result, all of the ash particles that drop off from the sieve of the coarse ash separator pass directly into the ash funnel, and pass into the regular removal path for the ash.

BRIEF DESCRIPTION OF THE DRAWINGS

The invention will be explained in greater detail subsequently with the aid of a preferred embodiment in conjunction with the accompanying drawings, in which:

FIG. 1 shows a schematic illustration of a coal-fired power station;

FIG. 2 shows a module of a pertaining catalytic converter for reducing the $NO_x$ level;

FIG. 3 shows a partial view of the units or baffles of a pertaining, regenerative preheater;

DESCRIPTION OF THE DRAWINGS

Figure 4:
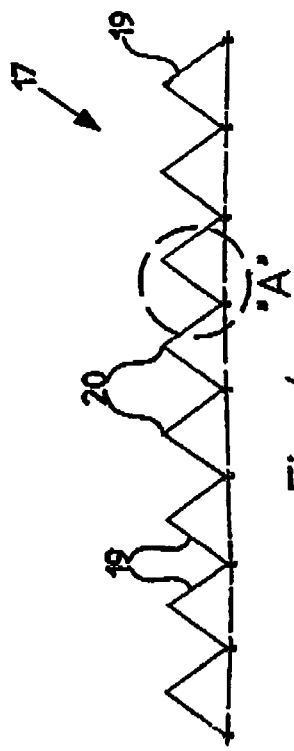
FIG. 4 shows in a very schematic illustration a horizontal cross-sectional view through a sieve of a coarse ash separator.

The coal-fired power plant or station of FIG. 1 is provided with a boiler 1 having a combustion chamber or firebox 2 for a dry firing, whereby an ash funnel 3 adjoins the combustion chamber 2. The boiler 1 furthermore includes heat exchangers 4, with a further ash funnel 5 adjoining the housings of the heat exchangers. The boiler 1 is connected via a flue gas channel 6 with a catalyzer or catalytic converter 7 for reducing the $NO_x$ level. The latter has a plurality of catalyzer stages 8 that are respectively composed of modules 9 (see FIG. 2). The dimensions of the channels formed by the modules 9 are 7.1 mm×7.1 mm×1000 mm.

Adjoining the catalytic converter 7 is an air pre-heater 10 that operates regeneratively and the units or baffles of which can be seen from the half illustration of FIG. 3. Following this are an electrostatic filter 11, an induced-draft blower 10 and a REA (flue gas desulfurization unit) scrubber 13, from which the cleaned flue gases pass into a chimney 14.

The flue gas channel 6 follows the ash funnel 5 via a horizontal section 15. Provided at the transition point is a coarse ash separator 17, which includes an oscillatingly suspended sieve 17 as well as a stop 18 that defines the rest position of the sieve 17.

During operation of the power station, the flue gas stream imparts oscillating movements to the sieve 17 of the coarse ash separator 16, and in particular due to the pulsations in the constant exhaust gas stream as well as due to changing throughputs occurring with changes in load. The oscillating movements cause coalesced or sintered coarse ash particles that are caught on the sieve 17 to fall off therefrom and to pass into the ash funnel 5. This effect is enhanced in that the sieve 17 from time to time strikes against the stop 18, which leads to the flinging off of the particles. In this way, the channels of the catalyzer stages 8 are protected from the penetration of coarse ash particles (>5 mm) that could otherwise accumulate in the channels and could clog them. At the same time, the air pre-heater 10 is protected.

The horizontal cross-section of FIG. 4 shows that the sieve 17 is comprised of planar surface sections 19 that are disposed at an angle to one another. These sections form folds 20 that are directed against the direction of flow. The coarse ash particles thus strike the surface sections 19 at an angle and are withdrawn parallel thereto. This avoids the tendency for the ash particles to become caught in the sieve openings. Furthermore, the folded configuration of the sieve 17 increases the passage surface thereof, so that without an increase of pressure loss it is possible to operate with relatively small sieve openings.

Figure 5:
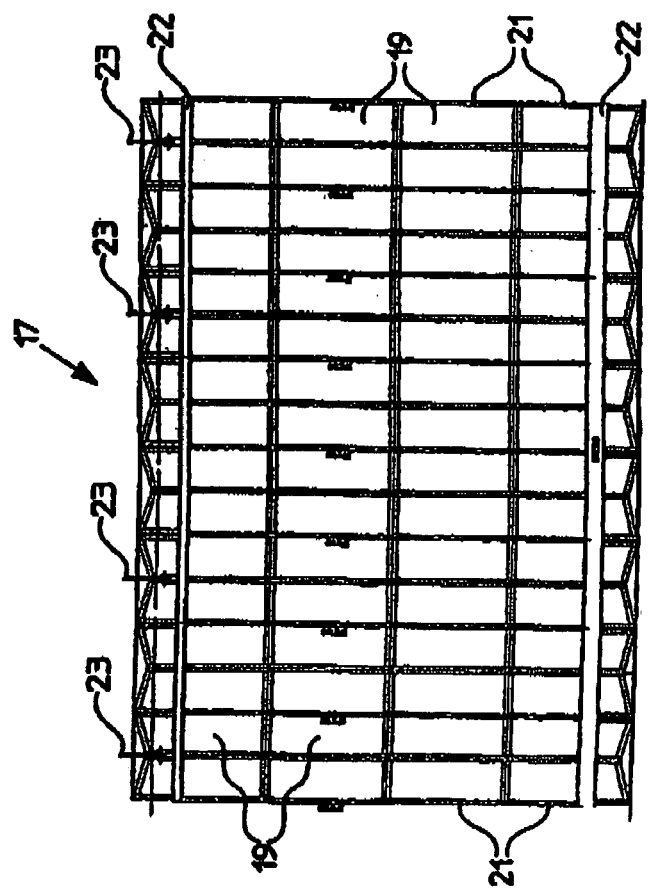
FIG. 5 shows a rearward view of the sieve of FIG. 4.

FIG. 5 shows that the surface sections 19 of the sieve 17 are drawn onto frames 21 that are secured to a support structure 22 and that can be individually replaced or exchanged. As can be seen from the rearward view of FIG. 5, the support structure 22 is disposed on the downstream side of the sieve 17.

As explained in conjunction with FIG. 1, the sieve 17 is oscillatingly suspended in the section 15 of the flue gas channel 6. Suspension elements 23, which are illustrated in FIG. 5, serve for this purpose.

Figure 6:
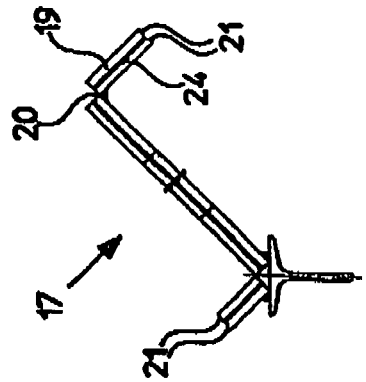
FIG. 6 shows the detail "A" of FIG. 4 in an enlarged scale.

It is evident from the detailed view of FIG. 6 that the surface sections 19 of the sieve 17 respectively rest upon a support network or mesh 24 and together therewith are drawn onto the respectively pertaining frame 21. While the sieve openings have the dimensions 5 mm×5 mm at a wire diameter or thickness of 1 mm, the mesh size of the support mesh is 33 mm×33 mm at a wire diameter of 3 mm. The support mesh 24 prevents a buckling of the pertaining surface secton 19 of the sieve 17.

Modification possibilities are readily within the scope of the invention. Primarily, with an oscillating suspension, the sieve can have a planar configuration or, with a folded configuration can be rigidly disposed in the flue gas channel, although the described combination of these features is particularly advantageous. Instead of the oscillating suspension, any other securement possibilities can be provided, even those where the return force is provided not by the force of gravity, but rather by the force of a spring or an elastic hinged connection. The use of counter weights is likewise possible. The stop that defines the rest position can effect a pre-deflection of the sieve. Although the structural configuration of FIGS. 5 and 6 is particularly advantageous, it can also be readily modified.

What is claimed:

1. A coal-fired power station, comprising:
   a boiler 1 heatable by dry firing;
   a catalytic converter 7 for reducing an $NO_x$ level;
   a flue gas channel 6 for conducting a flue gas stream, wherein said flue gas channel adjoins the boiler 1 and leads to the catalytic converter 7; and
   a coarse ash separator 16 disposed upstream of said catalytic converter 7 in a section 15 of said flue gas channel 6, wherein said coarse ash separator 16 includes a sieve 17 that extends essentially over an entire cross-sectional area of said section of said flue gas channel, and wherein said sieve 17 is adapted to be deflected out of a position of rest by a flue gas stream and against the effect of a restoring force.

2. A coal-fired power station according to claim 1, wherein a stop 18 is provided and defines said position of rest of said sieve 17.

3. A coal-fired power station according to claim 1, wherein said section 15 of said flue gas channel 6 in which said coarse ash separator 16 is disposed extends essentially horizontally, and wherein said sieve 17 of said coarse ash separator is hingedly suspended.

4. A coal-fired power station according to claim 3, wherein a stop 18 that defines said position of rest of said sieve 17 is offset in a downstream direction relative to said hinged suspension of said sieve 17.

5. A coal-fired power station according to claim 1, wherein said section 15 of said flue gas channel 6 in which said coarse ash separator is disposed adjoins an ash funnel 5, and wherein said coarse ash separator 16 is disposed at a transition of said ash channel 5 to said section 15 of said flue gas channel 6.

6. A coal-fired power station, comprising:
   a boiler 1 heatable by dry firing;
   a catalytic converter 7 for reducing an $NO_x$ level;
   a flue gas channel 6 for conducting a flue gas stream, wherein said flue gas channel adjoins the boiler 1 and leads to the catalytic converter 7; and
   a coarse ash separator 16 disposed upstream of said catalytic converter 7 in a section 15 of said flue gas channel 6, wherein said coarse ash separator 16 includes a sieve 17 that extends essentially over an entire cross-sectional area of said section of said flue gas channel, and wherein said sieve 17 forms folds 20 that are directed in an upstream direction relative to said flue gas stream and extend essentially parallel to one another.

7. A coal-fired power station according to claim 6, wherein said folds 20 of said sieve 17 are formed by planar surface sections 19 that are disposed at an angle relative to one another.

8. A coal-fired power station according to claim 7, wherein said surface sections 19 of said sieve 17 rest against support meshes 24 that are disposed in a downstream direction.

9. A coal-fired power station according to claim 8, wherein said surface sections 19 of said sieve 17, and said pertaining support meshes 24, are drawn onto frames 21 that are secured to a support structure 22.

10. A coal-fired power station according to claim 6, wherein said section 15 of said flue gas channel 6 in which said coarse ash separator is disposed adjoins an ash funnel 5, and wherein said coarse ash separator 16 is disposed at a transition of said ash channel 5 to said section 15 of said flue gas channel 6.

* * * * *